(12) United States Patent
Lee

(10) Patent No.: US 9,669,737 B2
(45) Date of Patent: Jun. 6, 2017

(54) VEHICLE SEAT

(71) Applicant: HON HAI PRECISION INDUSTRY CO., LTD., New Taipei (TW)

(72) Inventor: Chia-Yen Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 64 days.

(21) Appl. No.: 14/642,402

(22) Filed: Mar. 9, 2015

(65) Prior Publication Data
US 2016/0121759 A1    May 5, 2016

(30) Foreign Application Priority Data

Oct. 30, 2014    (TW) .............................. 103137698 A

(51) Int. Cl.
*B60N 2/02*    (2006.01)
*B60N 2/24*    (2006.01)
*B60N 2/44*    (2006.01)

(52) U.S. Cl.
CPC ......... *B60N 2/0244* (2013.01); *B60N 2/0232* (2013.01); *B60N 2/245* (2013.01); *B60N 2/449* (2013.01); *B60N 2/4492* (2015.04); *B60N 2002/0236* (2013.01); *B60N 2002/0256* (2013.01); *B60N 2002/0268* (2013.01); *B60N 2002/0272* (2013.01)

(58) Field of Classification Search
CPC .... B60N 2/0232; B60N 2/4492; B60N 2/449; B60N 2002/0236; B60N 2/0244; B60N 2002/0272; B60N 2002/0268; B60N 2002/0256
USPC .............................. 701/49; 297/284.3, 284.9
See application file for complete search history.

(56) References Cited

U.S. PATENT DOCUMENTS 8,118,359 B2 *    2/2012    Kyogoku ............. B60N 2/3038
                                                                                297/1

FOREIGN PATENT DOCUMENTS

GB            2081086 A *    2/1982    ............. B60N 2/449

* cited by examiner

*Primary Examiner* — Milton Nelson, Jr.
(74) *Attorney, Agent, or Firm* — Steven Reiss

(57) ABSTRACT

A vehicle seat includes a back portion, a seat portion, and two driving assemblies. The back portion includes a resisting portion and a movable portion. The seat portion is coupled to the back portion and includes a bottom wall and a movable wall. One driving assembly is positioned in the back portion and the other driving assembly is positioned in the seat portion. The driving assembly positioned in the back portion is coupled to the movable portion and is configured to drive the movable portion to move relative to the resisting portion. The driving assembly positioned in the seat portion is coupled to the movable wall and is configured to drive the movable wall to move relative to the bottom wall.

18 Claims, 5 Drawing Sheets

VEHICLE SEAT

CROSS-REFERENCE TO RELATED APPLICATIONS

This application claims priority to Taiwanese Patent Application No. 103137698 filed on Oct. 30, 2014, the contents of which are incorporated by reference herein.

FIELD

The subject matter herein generally relates to a vehicle seat.

BACKGROUND

Generally, for protecting passengers in a car turn, two sides of a vertically oriented back portion of a vehicle seat and a front end of a horizontally situated seat portion of the vehicle seat are designed to higher than other portions of the vehicle seat. However, it is inconvenient for the passengers to get on or off the cars, buses and other vehicles.

BRIEF DESCRIPTION OF THE DRAWINGS

Implementations of the present technology will now be described, by way of example only, with reference to the attached figures.

DETAILED DESCRIPTION

Figure 1:
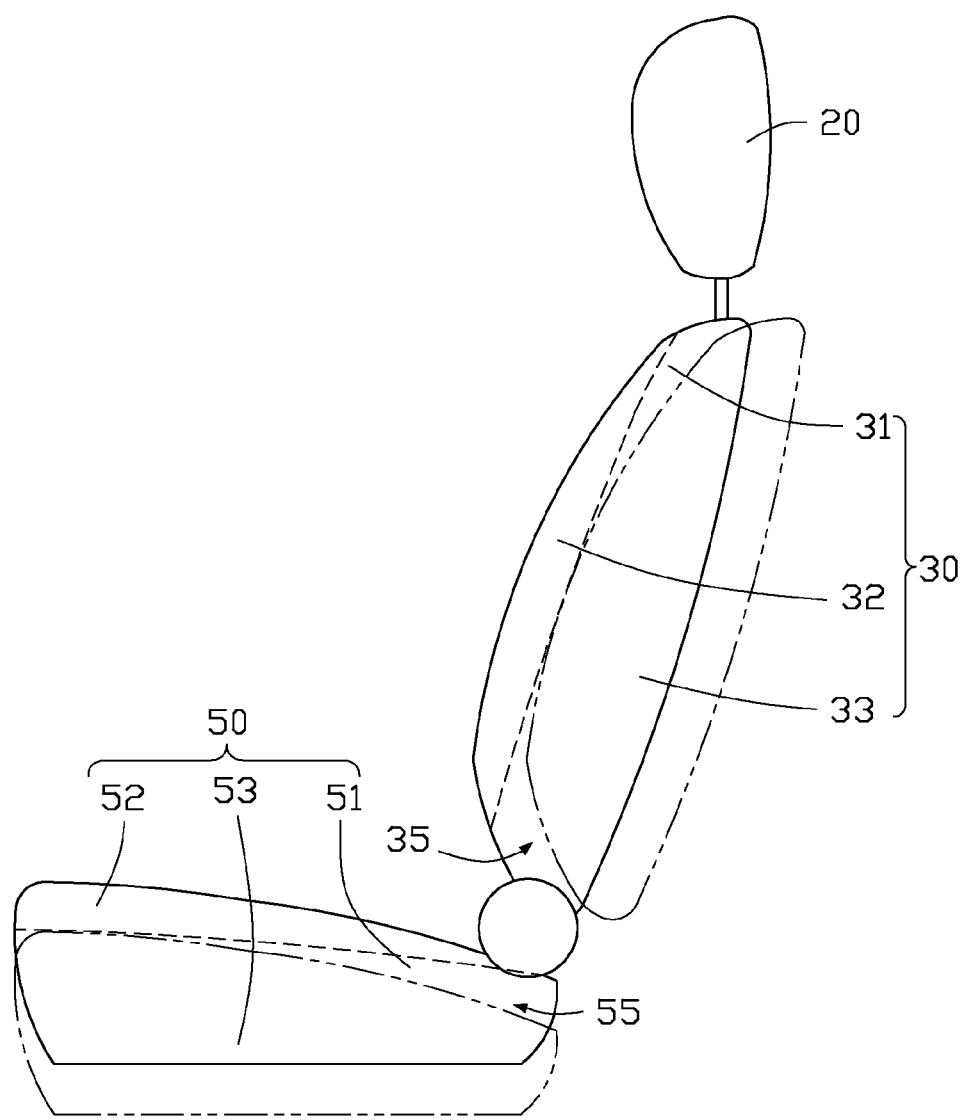
FIG. 1 is an isometric view of a first embodiment of a vehicle seat.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates a first embodiment of a vehicle seat 100. The vehicle seat 100 includes a headrest portion 20, a back portion 30, and a seat portion 50. The back portion 30 is substantially oriented in a vertical direction. The headrest portion 20 is retractably mounted to one end of the back portion 30 through a connecting member or the like. The seat portion 50 is substantially situated in a horizontal direction and is substantially perpendicularly coupled to one end of the back portion 30 away from the headrest portion 20.

The back portion 30 includes a resisting portion 31, a fixing portion 32, and a movable portion 33. The fixing portion 32 and the movable portion 33 are positioned at a same surface of the resisting portion 31 and are spaced apart from each other. The fixing portion 32 protrudes from and is secured to one side of the resisting portion 31. The movable portion 33 protrudes from and is movably mounted to another side of the resisting portion 31. The resisting portion 31, the fixing portion 32, and the movable portion 33 cooperatively form an accommodating space 35. The accommodating space 35 is configured to position a back and two arms of a passenger.

The seat portion 50 includes a bottom wall 51, a fixing wall 52, and a movable wall 53. The fixing wall 52 and the movable wall 53 are positioned at a same surface of the bottom wall 51 and are spaced apart from each other. The fixing wall 52 protrudes from and is secured to one side of the bottom wall 51. The movable wall 53 protrudes from and is movably mounted to another side of the bottom wall 51. The bottom wall 51, the fixing wall 52, and the movable wall 53 cooperatively form a holding space 55. The holding space 55 is configured to position a buttock and two legs of the passenger.

Figure 2:
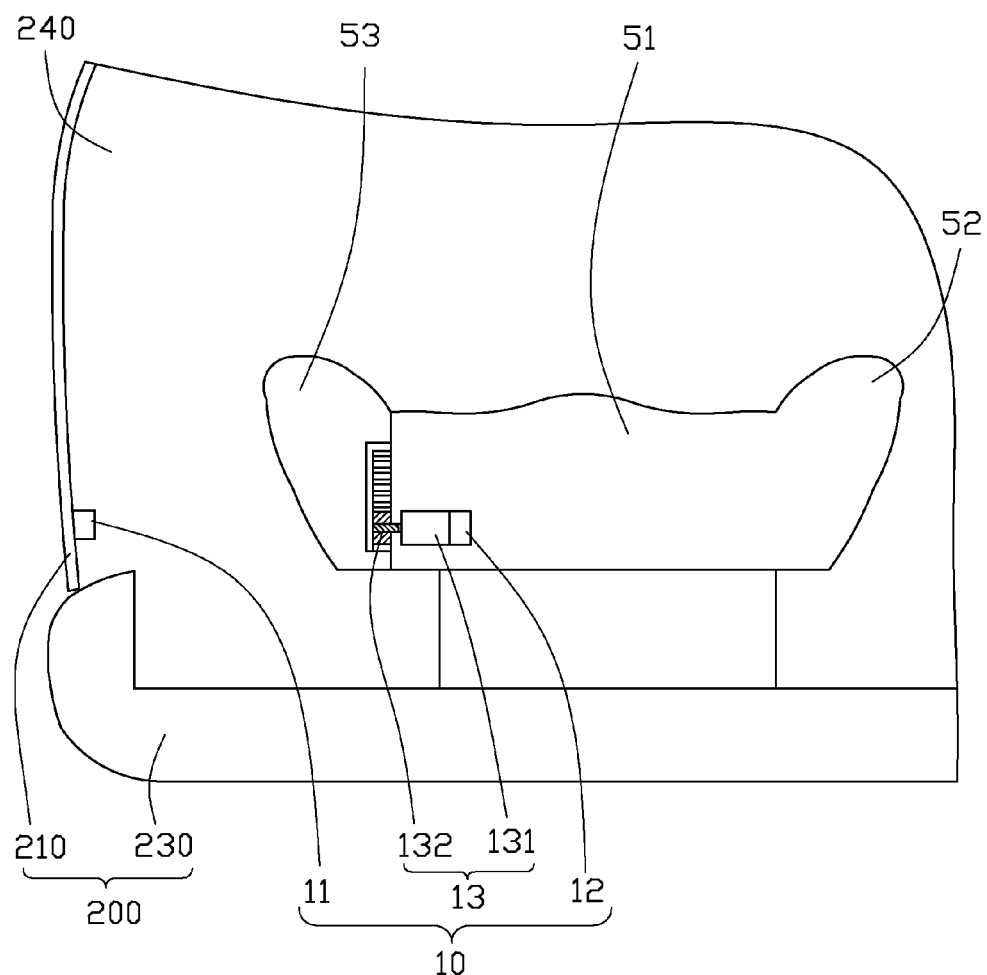
FIG. 2 is a plane view of the vehicle seat of FIG. 1 applied to a vehicle.

FIG. 2 illustrates that the vehicle seat 100 is applied to a vehicle 200. The vehicle 200 may be a car, a bus, or the like. In this embodiment, the vehicle 200 is a car and includes at least one door 210 and a chassis 230. The door 210 is substantially perpendicularly coupled to the chassis 230 and cooperatively forms a receiving space 240 with the chassis 230 for receiving the vehicle seat 100.

As illustrated, the vehicle seat 100 further includes two driving assemblies 10. One driving assembly 10 is located in the back portion 30 (not shown). The other driving assembly 10 is located in the seat portion 50. The two driving assemblies 10 are configured to drive the back portion 30 and the seat portion 50 to move. Each driving assembly 10 includes a sensing unit 11, a controlling unit 12, and a driving unit 13. The sensing unit 11 can be a sound sensor, an optics sensor, or other sensor having a function of generating signal to trigger the controlling unit 12 to work. The sensing unit 11 can be positioned at anywhere of the vehicle 200 for sensing braking information of the vehicle 200 and sending the sensed braking information to the controlling unit 12. The controlling unit 12 is electrically connected to the sensing unit 11 and the driving unit 13. The controlling unit 12 is configured to receive the braking information of the vehicle 200 sensed by the sensing unit 11 and output a controlling signal to the driving unit 13 according to the received braking information. The driving unit 13 is configured to receive the controlling signal from the controlling unit 12 and drive the back portion 30 and the seat portion 50 to move.

In this embodiment, the sensing unit 11 is mounted to the door 210. The sensing unit 11 is configured to sense whether the door 210 is in an opened state or a closed state and send a sensing signal corresponding to the sensed state of the door 210 to the controlling unit 12. For example, when the sensing unit 11 senses that the door 210 is opened, the sensing unit 11 sends a first sensing signal (for example, logic 1) to the controlling unit 12. When the sensing unit 11 senses that the door 210 is closed, the sensing unit 11 sends a second sensing signal (for example, logic 0) to the controlling unit 12.

The controlling unit 12 is configured to receive the sensing signal from the sensing unit 11 and output the controlling signal to the driving unit 13. For example, when the controlling unit 12 receives the first sensing signal, which indicating that the door 210 of the vehicle 200 is opened, the controlling unit 12 outputs a first controlling signal (for example, logic 1) to the driving unit 13. When the controlling unit 12 receives the second sensing signal, which indicating that the door 210 of the vehicle 200 is closed, the controlling unit 12 outputs a second controlling signal (for example, logic 0) to the driving unit 13.

When the driving unit 13 receives the first controlling signal, the driving unit 13 positioned in the back portion 30 controls the movable portion 33 to move relative to the resisting portion 31 until the movable portion 33 is substantially collinear with the resisting portion 31. The driving unit 13 positioned in the seat portion 50 controls the movable wall 53 to move relative to the bottom wall 51 until the movable wall 53 is substantially collinear with the bottom wall 51. When the driving unit 13 receives the second controlling signal, the driving unit 13 positioned in the back portion 30 controls the movable portion 33 to return to an original state. The driving unit 13 positioned in the seat portion 50 controls the movable wall 53 to return to an original state.

In this embodiment, each driving unit 13 includes a motor 131 and a gear member 132. One motor 131 is positioned in the resisting portion 31 and is electrically connected to one controlling unit 12. The other motor 131 is positioned in the bottom wall 51 and is electrically connected to the other controlling unit 12. One gear member 132 is positioned in the movable portion 33 and is coupled to the motor 131 positioned in the resisting portion 31. The other gear member 132 is positioned in the movable wall 53 and is coupled to the motor 131 positioned in the bottom wall 51.

Figure 3:
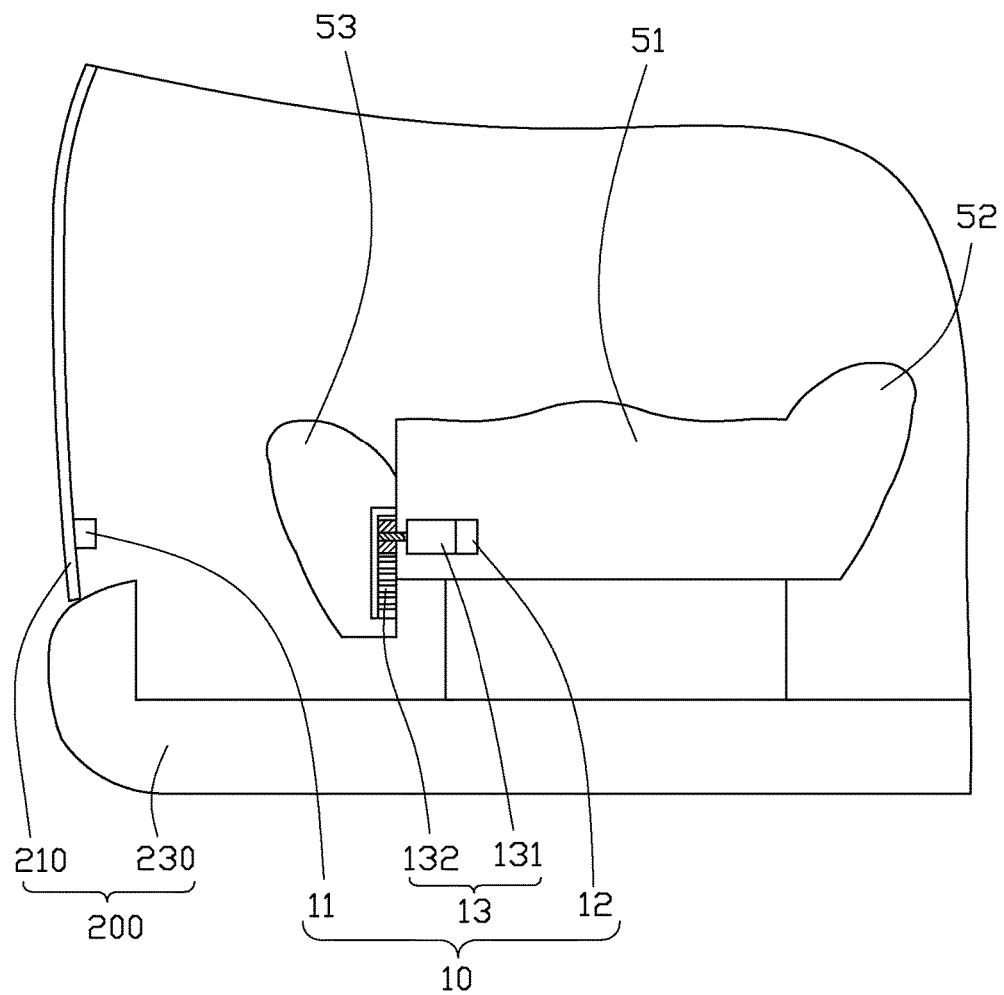
FIG. 3 is similar to FIG. 2, but showing the vehicle seat in a movable state.

Referring to FIG. 3, when the motor 131 receives the first controlling signal from the controlling unit 12, the motor 131 positioned in the back portion 30 controls the movable portion 33 to move along a first horizontal direction (for example, move right) relative to the resisting portion 31 until the movable portion 33 is substantially collinear with the resisting portion 31. The motor 131 positioned in the seat portion 50 controls the movable wall 53 to move along a first vertical direction (for example, move down) relative to the bottom wall 51 until the movable wall 53 is substantially collinear with the bottom wall 51.

When the motor 131 receives the second controlling signal from the controlling unit 12, the motor 131 positioned in the back portion 30 controls the movable portion 33 to move along a second horizontal direction (for example, move left) for returning to the original state. The motor 131 positioned in the seat portion 50 controls the movable wall 53 to move along a second vertical direction (for example, move up) for returning to the original state.

Figure 4:
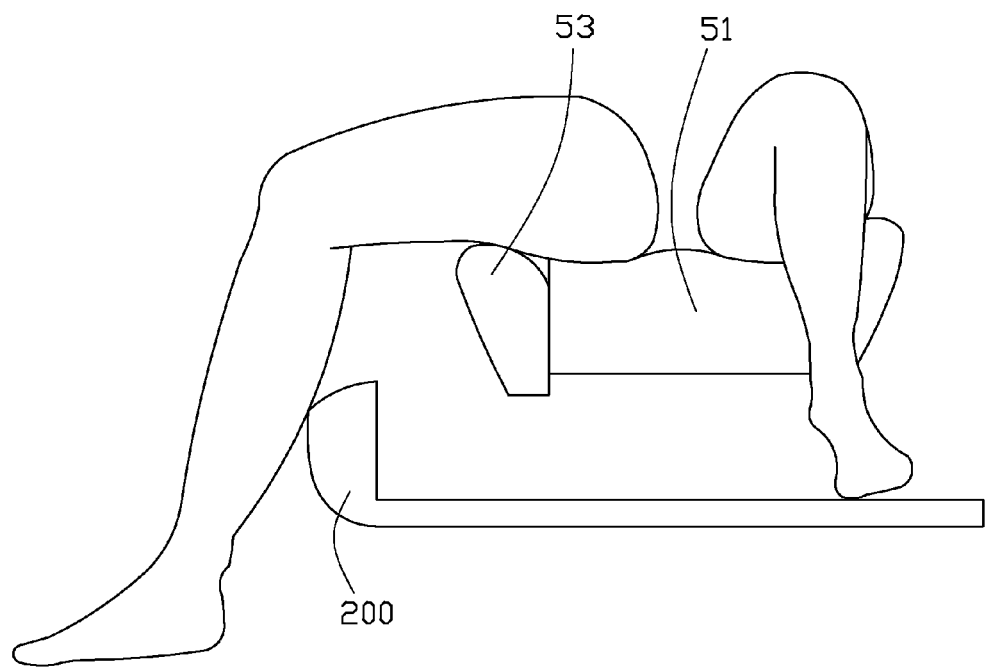
FIG. 4 is an isometric view of the vehicle seat of FIG. 3, showing the vehicle seat in a using state.

FIG. 4 illustrates that when the door 210 is opened for the passenger getting on or off the vehicle 200. The sensing unit 11 senses it and sends a first sensing signal to the controlling unit 12. The controlling unit 12 receives the first sensing signal and outputs a first controlling signal to the motor 131. The motor 131 receives the first controlling signal. Then, the motor 131 positioned in the back portion 30 controls the movable portion 33 to move relative to the resisting portion 31. The motor 131 positioned in the seat portion 50 controls the movable wall 53 to move relative to the bottom wall 51. In this way, the movable portion 33 is substantially collinear with the resisting portion 31 and the movable wall 53 is substantially collinear with the bottom wall 51, which facilitates the passenger to get on or off the vehicle 200 and prevents an abrasion of the vehicle seat 100.

Figure 5:
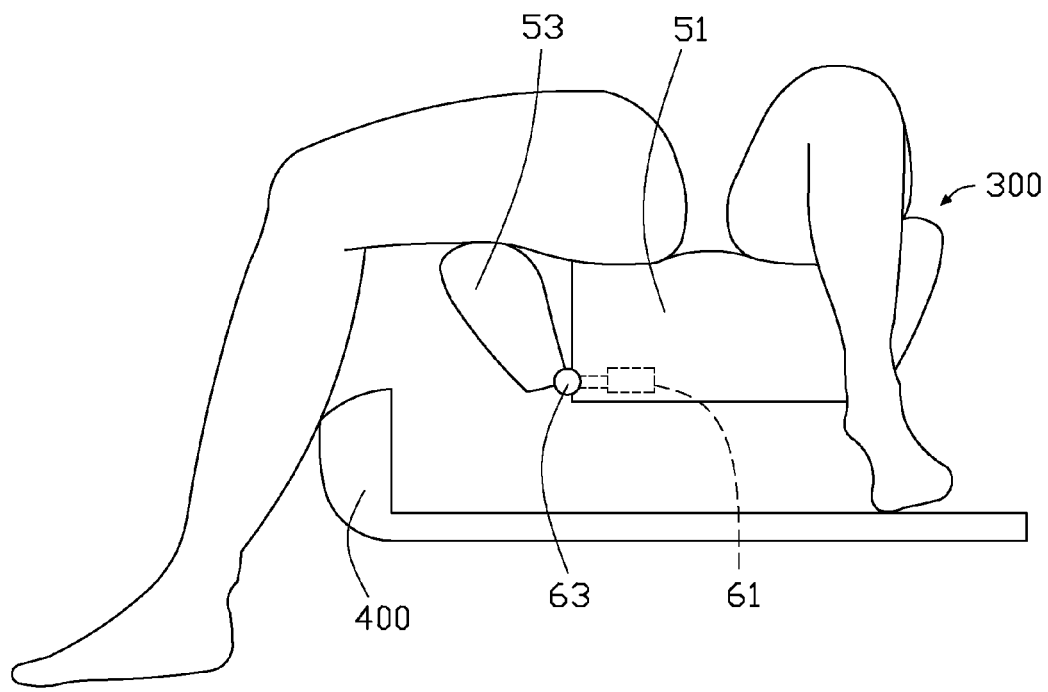
FIG. 5 is an isometric view of a second embodiment of a vehicle seat, showing the vehicle seat in a using state.

FIG. 5 illustrates a second embodiment of a vehicle seat 300 applied to a vehicle 400. The vehicle seat 300 differs from the vehicle seat 100 in that the motor 131 is replaced by a cylinder member 61 and the gear member 132 is replaced by a rotating member 63. The movable portion 33 of the back portion 30 is rotatably coupled to the resisting portion 31 via the rotating member 63. The movable wall 53 of the seat portion 50 is rotatably coupled to the bottom wall 51 via the rotating member 63. The cylinder member 61 is coupled to the rotating member 63 for controlling the rotating member 63 to rotate, so that the movable portion 33 can rotate relative to the resisting portion 31 until the movable portion 33 is collinear with the resisting portion 31, and the movable wall 53 can rotate relative to the bottom wall 51 until the movable wall 53 is collinear with the bottom wall 51.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A vehicle seat comprising:
    a back portion comprising a resisting portion and a movable portion protruding from one side of the resisting portion;
    a seat portion coupled to the back portion and comprising a bottom wall and a movable wall protruding from one side of the bottom wall; and
    two driving assemblies;
    wherein each driving assembly comprises a sensing unit and a driving unit electrically connected to the sensing unit; the sensing unit senses braking information of the vehicle; the driving unit of one driving assembly is coupled to the movable portion and is configured to drive the movable portion to move relative to the resisting portion; and the driving unit of the other driving assembly is coupled to the movable wall and is configured to drive the movable wall to move relative to the bottom wall.

2. The vehicle seat of claim 1, wherein the back portion further comprises a fixing portion, the fixing portion protrudes from and is secured to one side of the resisting portion away from the movable portion; and the resisting portion, the fixing portion, and the movable portion cooperatively form an accommodating space for positioning a back and two arms of a passenger.

3. The vehicle seat of claim 1, wherein the seat portion further comprises a fixing wall, the fixing wall protrudes from and is secured to one side of the bottom wall away from the movable wall; and the bottom wall, the fixing wall, and the movable wall cooperatively form a holding space for positioning a buttock and two legs of the passenger.

4. The vehicle seat of claim 1, wherein each driving assembly further comprises a controlling unit electrically connected to the sensing unit and the driving unit; the controlling unit is configured to receive the braking information of the vehicle sensed by the sensing unit and output a controlling signal to the driving unit.

5. The vehicle seat of claim 4, wherein the sensing unit is one of a sound sensor, an optics sensor, and other sensor having a function of generating signal to trigger the controlling unit to work.

6. The vehicle seat of claim 4, wherein the sensing unit is configured to sense whether a door of the vehicle is in an opened state or a closed state and send a sensing signal corresponding to a sensed state of the door to the controlling unit.

7. The vehicle seat of claim 6, wherein the driving unit of one driving assembly is positioned in the back portion, and the driving unit of the other driving assembly is positioned in the seat portion; when the sensing unit senses that the door is closed, the sensing unit sends a second sensing signal to the controlling unit, the controlling unit receives the second sensing signal from the sensing unit and outputs a second controlling signal to the driving unit, the driving unit positioned in the back portion receives the second controlling signal and controls the movable portion to return to an original state; the driving unit positioned in the seat portion receives the second controlling signal and controls the movable wall to return to the original state.

8. The vehicle seat of claim 6, wherein the driving unit of one driving assembly is positioned in the back portion, and the driving unit of the other driving assembly is positioned in the seat portion; when the sensing unit senses that the door is opened, the sensing unit sends a first sensing signal to the controlling unit, the controlling unit receives the first sensing signal from the sensing unit and outputs a first controlling signal to the driving unit, the driving unit positioned in the back portion receives the first controlling signal and controls the movable portion to move relative to the resisting portion; the driving unit positioned in the seat portion receives the first controlling signal and controls the movable wall to move relative to the bottom wall.

9. The vehicle seat of claim 8, wherein each driving unit comprises a motor and a gear member, the motor is electrically connected to the controlling unit; the gear member is coupled to the motor, the motor is configured to control the movable portion to move in a horizontal direction and control the movable wall to move in a vertical direction.

10. A vehicle seat applied to a vehicle, the vehicle seat comprising:
 a back portion;
 a seat portion coupled to the back portion;
 a movable portion movably protruding from one side of the back portion;
 a movable wall movably protruding from one side of the seat portion; and
 two driving assemblies;
 wherein each driving assembly comprises a sensing unit and a driving unit electrically connected to the sensing unit; the sensing unit senses braking information of the vehicle; the driving unit of one driving assembly is coupled to the movable portion and is configured to drive the movable portion to move relative to the back portion; the driving unit of the other driving assembly is coupled to the movable wall and is configured to drive the movable wall to move relative to the seat portion.

11. The vehicle seat of claim 10, wherein the back portion further comprises a resisting portion and a fixing portion, the fixing portion protrudes from and is secured to one side of the resisting portion; the movable portion movably protrudes from one side of the resisting portion away from the fixing portion; and the resisting portion, the fixing portion, and the movable portion cooperatively form an accommodating space for positioning a back and two arms of a passenger.

12. The vehicle seat of claim 10, wherein the seat portion further comprises a bottom wall and a fixing wall, the fixing wall protrudes from and is secured to one side of the bottom wall; the movable wall movably protrudes from one side of the bottom wall away from the fixing wall; and the bottom wall, the fixing wall, and the movable wall cooperatively form a holding space for positioning a buttock and two legs of the passenger.

13. The vehicle seat of claim 10, wherein each driving assembly further comprises a controlling unit, the controlling unit is electrically connected to the sensing unit and the driving unit; the controlling unit is configured to receive the braking information of the vehicle sensed by the sensing unit and output a controlling signal to the driving unit to control the driving unit to work.

14. The vehicle seat of claim 13, wherein the sensing unit is one of a sound sensor, an optics sensor, and other sensor having a function of generating signal to trigger the controlling unit to work.

15. The vehicle seat of claim 13, wherein the sensing unit is configured to sense whether a door of the vehicle is in an opened state or a closed state and send a sensing signal corresponding to a sensed state of the door to the controlling unit.

16. The vehicle seat of claim 15, wherein the driving unit of one driving assembly is positioned in the back portion, and the driving unit of the other driving assembly is positioned in the seat portion; when the sensing unit senses that the door is closed, the sensing unit sends a second sensing signal to the controlling unit, the controlling unit receives the second sensing signal from the sensing unit and outputs a second controlling signal to the driving unit, the driving unit positioned in the back portion receives the second controlling signal and controls the movable portion to return to an original state; and the driving unit positioned in the seat portion receives the second controlling signal and controls the movable wall to return to the original state.

17. The vehicle seat of claim 15, wherein the driving unit of one driving assembly is positioned in the back portion, and the driving unit of the other driving assembly is positioned in the seat portion; when the sensing unit senses that the door is opened, the sensing unit sends a first sensing signal to the controlling unit, the controlling unit receives the first sensing signal from the sensing unit and outputs a first controlling signal to the driving unit, the driving unit positioned in the back portion receives the first controlling signal and controls the movable portion to move relative to the back portion; the driving unit positioned in the seat portion receives the first controlling signal and controls the movable wall to move relative to the seat portion.

18. The vehicle seat of claim 17, wherein each driving unit comprises a motor and a gear member, the motor is electrically connected to the controlling unit; the gear member is coupled to the motor, the motor is configured to control the movable portion to move in a horizontal direction and control the movable wall to move in a vertical direction.

* * * * *